(12) United States Patent
Kamath et al.

(10) Patent No.: US 7,007,035 B2
(45) Date of Patent: Feb. 28, 2006

(54) PARALLEL OBJECT-ORIENTED DECISION TREE SYSTEM

(75) Inventors: Chandrika Kamath, Dublin, CA (US); Erick Cantu-Paz, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 333 days.

(21) Appl. No.: 09/877,570

(22) Filed: Jun. 8, 2001

(65) Prior Publication Data

US 2003/0061228 A1    Mar. 27, 2003

(51) Int. Cl.
*G06F 17/30* (2006.01)
(52) U.S. Cl. .......................... 707/102; 706/45; 712/13
(58) Field of Classification Search ................ 707/102; 706/45; 712/13
See application file for complete search history.

(56) References Cited

U.S. PATENT DOCUMENTS

| | | | | |
|---|---|---|---|---|
| 5,319,740 A | * | 6/1994 | Yamada et al. | 706/59 |
| 5,692,107 A | | 11/1997 | Simoudis et al. | 395/50 |
| 5,758,147 A | | 5/1998 | Chen et al. | 395/606 |
| 5,787,274 A | * | 7/1998 | Agrawal et al. | 707/102 |
| 5,787,425 A | | 7/1998 | Bigus | 707/6 |
| 5,799,311 A | * | 8/1998 | Agrawal et al. | 707/102 |
| 5,805,915 A | * | 9/1998 | Wilkinson et al. | 712/20 |
| 5,870,735 A | * | 2/1999 | Agrawal et al. | 707/3 |
| 5,875,285 A | * | 2/1999 | Chang | 706/53 |
| 5,987,468 A | * | 11/1999 | Singh et al. | 707/100 |
| 6,049,861 A | | 4/2000 | Bird et al. | 712/28 |
| 6,055,539 A | * | 4/2000 | Singh et al. | 707/102 |
| 6,088,511 A | * | 7/2000 | Hardwick | 717/149 |
| 6,212,526 B1 | * | 4/2001 | Chaudhuri et al. | 707/102 |
| 6,212,617 B1 | * | 4/2001 | Hardwick | 712/3 |
| 6,230,151 B1 | * | 5/2001 | Agrawal et al. | 706/12 |
| 6,278,464 B1 | * | 8/2001 | Kohavi et al. | 345/440 |
| 6,301,579 B1 | * | 10/2001 | Becker | 707/102 |
| 6,311,265 B1 | * | 10/2001 | Beckerle et al. | 712/203 |
| 6,430,547 B1 | * | 8/2002 | Busche et al. | 707/1 |
| 6,523,016 B1 | * | 2/2003 | Michalski | 706/12 |
| 6,553,366 B1 | * | 4/2003 | Miller et al. | 707/2 |
| 6,563,952 B1 | * | 5/2003 | Srivastava et al. | 382/225 |
| 6,564,197 B1 | * | 5/2003 | Sahami et al. | 706/55 |
| 6,564,202 B1 | * | 5/2003 | Schuetze et al. | 707/1 |
| 6,567,814 B1 | * | 5/2003 | Bankier et al. | 707/101 |
| 2002/0133721 A1 | * | 9/2002 | Adjaoute | 713/201 |
| 2002/0186818 A1 | * | 12/2002 | Amaud et al. | 378/165 |

OTHER PUBLICATIONS

S. K. Murthy, et al., "A System for Induction of Oblique Decision Trees," 1994, Journal of Artificial Intelligence Research 2 (1994), pp. 1-32.

S. G. Chang, et al., "Adaptive Wavelet Thresholding for Image Denoising and Compression," Oct. 1997, IEEE Transactions on Image Processing, pp. 1-35.

(Continued)

*Primary Examiner*—Wayne Amsbury
(74) *Attorney, Agent, or Firm*—Eddie E. Scott; Alan H. Thompson

(57) ABSTRACT

A data mining decision tree system that uncovers patterns, associations, anomalies, and other statistically significant structures in data by reading and displaying data files, extracting relevant features for each of the objects, and using a method of recognizing patterns among the objects based upon object features through a decision tree that reads the data, sorts the data if necessary, determines the best manner to split the data into subsets according to some criterion, and splits the data.

4 Claims, 5 Drawing Sheets

OTHER PUBLICATIONS

A. Bruce, et al., "Applied Wavelet Analysis with S-PLUS," 1996, http://www.springer_ny.com/catalog/np1jul96np/DATA/0-387-94714-0.html, 1 page.

K. Alsabti, et al., "CLOUDS: A Decision Tree Classifier for Large Datasets," Oct. 27, 1998, pp. 1-34.

C. Kamath, et al., "On the design and implementation of a parallel, object-oriented, image processing toolkit," Center for Applied Scientific Computing, Lawrence Livermore National Laboratory, 2000, 13 pages.

P.B. Duffy, et al., "Effect of Missing Data on Estimates of Near-Surface Temperature Change Since 1900," 2000, UCRL-JC-140272-ABS, 2 pages.

R. Todd Ogden, "Essential Wavelets for Statistical Applications and Data Analysis," 1997, Birkhauser, 16 pages.

D. Donoho, et al., "Ideal Spatial Adaptation by Wavelet Shrinkage," 1994, Biometrika (1994), 81, 3. pp. 425-455.

R. Kohavi, et al., "MLC++: A Machine Learning Library in C++," 1994, Appears in Tools with AI '94, 4 pages.

Imola K. Fodor, et al., "On denoising images using wavelet-based statistical techniques," 2001, IEEE Transactions in Image Provessing vol. XX, No. Y, 2001, draft, pp. 100-125.

C. Kamath, et al, "On the design and implementation of a parallel, object-oriented, image processing toolkit," Jul. 2000, Parallel and Distributed Methods for Image Processing IV, 12 pages.

C. Kamath, et al., "On the Design of a Parallel Object-Oriented Data Mining Toolkit," 2000, Workshop on Distributed and Parallel Knowledge Discovery, Boston, MA Aug., 20, 2000, 16 pages.

M. Joshi, "ScalParC: A New Scalable and Efficient Parallel Classification Algorithm for Mining Large Datasets," Apr. 1998, 20 pages.

E. Cantu-Paz, et al., "Using Evolutionary Algorithms to Induce Oblique Decision Trees," 2000, Center for Applied Scientific Computing, Lawrence Livermore National Laboratory, 11 pages.

D. Donoho, et al., "Wavelab 802 for Matlab5.x," http://www-stat.standord.edu/~wavelab, Oct. 3, 1999, 3 pages.

A. Bruce, et al., "WaveShrink: Shrinkage Functions and Thresholds," StatSci Division, MathSoft, Inc., 1995, 12 pages.

F. Ruggeri, et al., "A Bayesian Decision Theoretic Approach to Wavelet Thresholding," CNR-IAMI and Duke University, preprint 1995 (published date 1998), 17 pages.

* cited by examiner

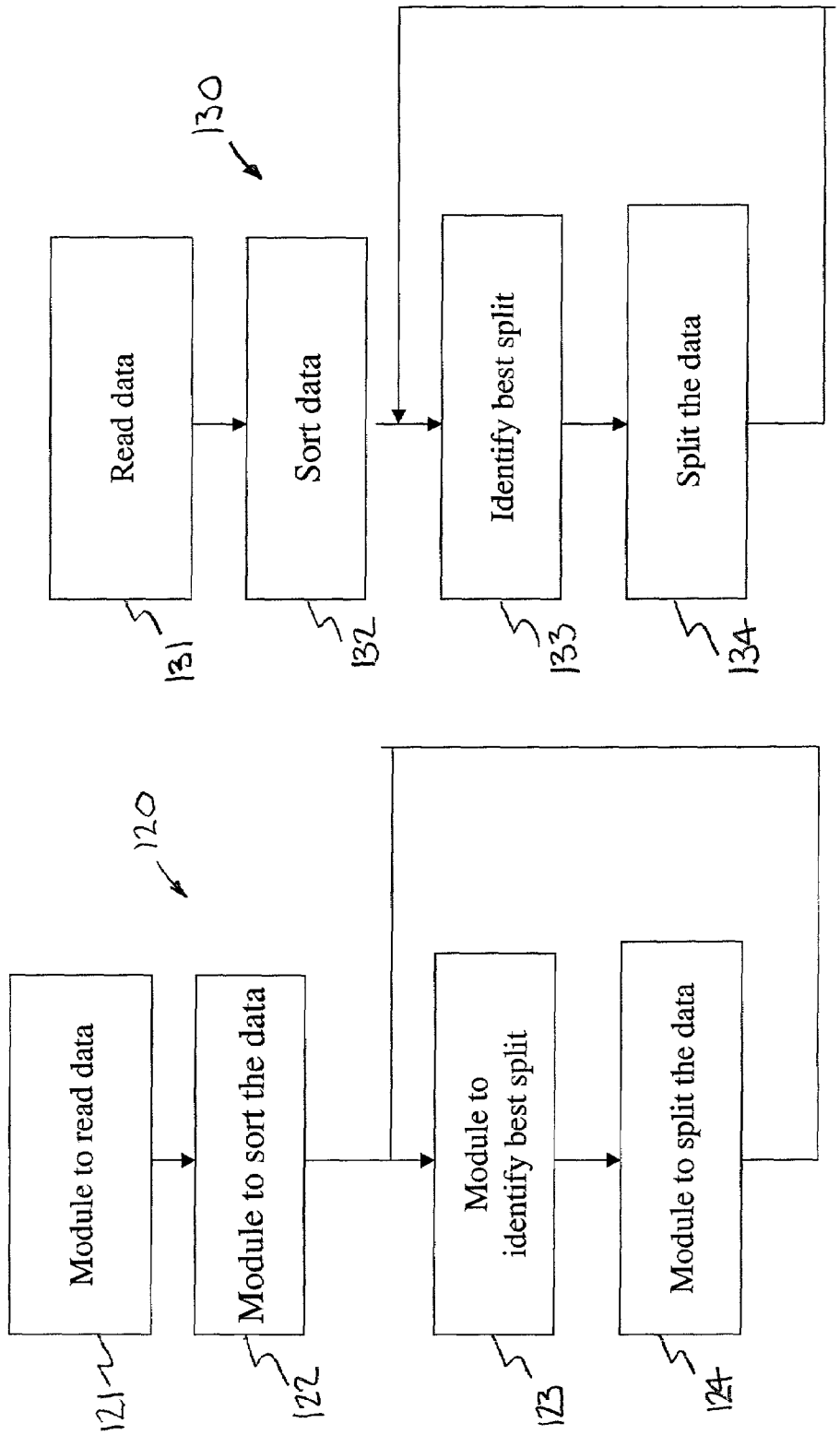

PARALLEL OBJECT-ORIENTED DECISION TREE SYSTEM

PARALLEL OBJECT-ORIENTED DECISION TREE SYSTEM

The United States Government has rights in this invention pursuant to Contract No. W-7405-ENG-48 between the United States Department of Energy and the University of California for the operation of Lawrence Livermore National Laboratory.

CROSS REFERENCE TO RELATED APPLICATIONS

Related subject matter is disclosed and claimed in the following commonly owned, copending, U.S. patent applications, "PARALLEL OBJECT-ORIENTED DATA MINING SYSTEM," by Chandrika Kamath and Erick Cantu-Paz, patent application Ser. No. 09/877,685, filed Jun. 8, 2001, and, "PARALLEL OBJECT-ORIENTED, DENOISING SYSTEM USING WAVELET MULTIRESOLUTION ANALYSIS," by Chandrika Kamath, Chuck H. Baldwin, Imola K. Fodor, and Nu A. Tang, patent application Ser. No. 09/877,962, filed Jun. 8, 2001, which are hereby incorporated by reference in their entirety.

BACKGROUND OF THE INVENTION

1. Field of Endeavor

The present invention relates to decision trees and more particularly to a parallel object-oriented decision tree system.

2. State of Technology

U.S. Pat. No. 5,787,425 for an object-oriented data mining framework mechanism by Joseph Phillip Bigus, patented Jul. 28, 1998 provides the following description, "The development of the EDVAC computer system of 1948 is often cited as the beginning of the computer era. Since that time, computer systems have evolved into extremely sophisticated devices, capable of storing and processing vast amounts of data. As the amount of data stored on computer systems has increased, the ability to interpret and understand the information implicit in that data has diminished. In the past, data was stored in flat files, then hierarchical and network data based systems, and now in relational or object oriented databases. The primary method for analyzing that data has been to form well structured queries, for example using SQL (Structured Query Language), and then to perform simple aggregations or hypothesis testing against that data. Recently, a new technique called data mining has been developed, which allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information. Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground."

The paper "Using Evolutionary Algorithms to Induce Oblique Decision Trees," by Erick Cantu-Paz and Chandrika Kamath, presented at the Genetic and Evolutionary Computation Conference, Las Vegas, Nev., Jul. 8–12, 2000 indicates that decision trees (DTs) are popular classification methods, and there are numerous algorithms to induce a tree classifier from a given set of data. Most of the tree inducing algorithms create tests at each node that involve a single attribute of the data. These tests are equivalent to hyperplanes that are parallel to one of the axes in the attribute space, and therefore the resulting trees are called axis-parallel. These simple univariate tests are convenient because a domain expert can interpret them easily, but they may result in complicated and inaccurate trees if the data is more suitably partitioned by hyperplanes that are not axis-parallel. Oblique decision trees use multivariate tests that are not necessarily parallel to an axis, and in some domains may result in much smaller and accurate trees. However, these trees are not as popular as the axis-parallel trees because the tests are harder to interpret, and the problem of finding oblique hyperplanes is more difficult than finding axis-parallel partitions, requiring greater computational effort. The paper "Using Evolutionary Algorithms to Induce Oblique Decision Trees," by Erick Cantu-Paz and Chandrika Kamath, presented at the Genetic and Evolutionary Computation Conference, Las Vegas, Nev., Jul. 8–12, 2000 is incorporated herein by this reference.

SUMMARY OF THE INVENTION

The present invention provides a data mining decision tree system that uncovers patterns, associations, anomalies, and other statistically significant structures in data by recognizing patterns among objects in the data based upon features of the data. The decision tree process includes reading the data, determining the best manner to split the data into subsets according to some criterion, and splitting the data. The decision tree system is part of the parallel object-oriented pattern recognition module, which in turn is part of an object oriented data mining system. The decision tree system includes an object oriented module to read the data, an object oriented module to sort the data if sorting is necessary, an object oriented module to determine the best manner to split the data into subsets according to some criterion, and an object oriented module to split the data. As part of the pattern recognition module, the decision tree system interacts with the other modules of the object oriented data mining system. These include an object oriented feature extraction module to extract features from the objects in the data, a storage module to store the features, and an object oriented module for linking the modules of the data mining system.

The present invention has an enormous number of uses. It provides a decision tree system for scientific, engineering, business and other data. The system has applications which include, but are not limited to the following: astrophysics, detecting credit card fraud, assuring the safety and reliability of the nation's nuclear weapons, nonproliferation and arms control, climate modeling, the human genome effort, computer network intrusions, reveal consumer buying patterns, recognize faces, recognize eyes, recognize fingerprints, analyze optical characters, analyze the makeup of the universe, analyze atomic interactions, web mining, text mining, multi-media mining, and analyzing data gathered from simulations, experiments, or observations.

Embodiments of the present invention provide scientific researchers with tools for use in plowing through enormous data sets to turn up information that will help them better understand the world around us and assist them in performing a variety of scientific endeavors. Other embodiments of the present invention provide academic and business users with tools for use in plowing through enormous data sets to turn up information that will help them perform a variety of endeavors. The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 1 is a flow chart illustrating decision tree modules used in one embodiment of the present invention.

FIG. 2 is a flow chart illustrating a decision tree method used in one embodiment of the present invention.

DETAILED DESCRIPTION OF THE INVENTION

Figure 3:
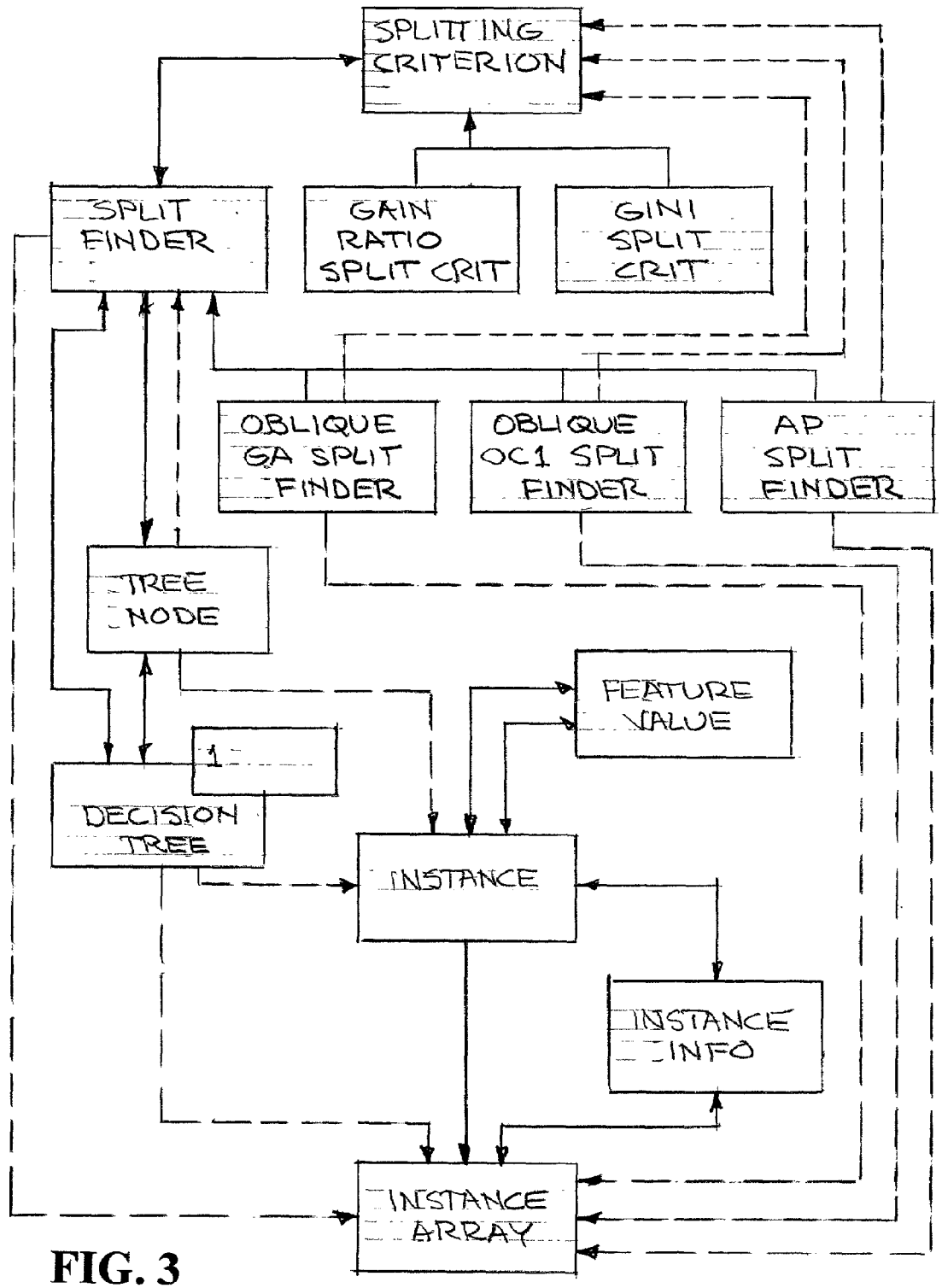
FIG. 3 is the UML Class Diagram for decision trees.

Referring now to the drawings, to the following description, and to incorporated information; a detailed description including specific embodiments of the invention are described. The detailed description of the specific embodiments, together with the general description of the invention, serve to explain the principles of the invention.

DATA MINING—Data mining is a process concerned with uncovering patterns, associations, anomalies, and statistically significant structures and events in data. It cannot only help us in knowledge discovery, that is, the identification of new phenomena, but it is also useful in enhancing our understanding of known phenomena. One of the key steps in data mining is pattern recognition, namely, the discovery and characterization of patterns in image and other high-dimensional data. A pattern is defined as an arrangement or an ordering in which some organization of underlying structure can be said to exist. Patterns in data are identified using measurable features or attributes that have been extracted from the data.

The present invention provides a decision tree system for data mining large, complex data sets. The system can be used to uncover patterns, anomalies and other statistically significant structures in data. The system has an enormous number of uses. It has applications which include, but are not limited to, astrophysics, detecting credit card fraud, assuring the safety and reliability of the nation's nuclear weapons, nonproliferation and arms control, climate modeling, the human genome effort, computer network intrusions, reveal consumer buying patterns, recognize faces, recognize eyes, recognize fingerprints, analyze optical characters, analyze the makeup of the universe, analyze atomic interactions, web mining, text mining, multi-media mining, and analyzing data gathered from simulations, experiments, or observations. Other examples of use of data mining for scientific data include the following:

Astronomy:
separating stars from galaxies
clustering galaxies according to their shape (uses a similar approach, but with clustering algorithms instead of classification algorithms)
detecting volcanoes on Venus
Biology:
human genome
analyzing mammograms to detect cancerous tumors
analyzing MRI/PET/SPECT data to identify growth/shrinkage of tumor (this would require data fusion, a key step in which is image registration. So, you would "register" the before and after images to see the changes in the tumor.)
Chemistry:
analyzing the data from the results of combinatorial chemistry experiments to identify any patterns in the data.
Remote sensing:
identifying land use
exploration for minerals, oil etc.

The present invention also has use in mining business data. Examples of use of data mining for business data include the following:
detecting credit card fraud
market-basket analysis: identifying what items people buy together
customer retention: identifying which customer is likely to leave a service (e.g. change telephone providers).

The present invention has use in mining engineering data. Examples of use of data mining for engineering data include:

network intrusion detection
identifying damage in structures such as bridges, airplanes, or buildings
identifying coherent structures in turbulent flow
optimization of engineering design The present invention has use in other areas. Examples of use of data mining for "other" data include:
fingerprint recognition
face/retinal identification
computer vision
military applications The present invention is useful in an object-oriented system using tightly-coupled processors. One aspect is to focus on distributed memory architectures where each compute node has its own memory, and the nodes share only the interconnection. The architecture of such systems is scalable with increasing number of processors, making them well suited to mining massive data sets. Another aspect of the system is that each node of a distributed memory system is a symmetric multi-processor (SMP), that is, the system is a cluster of SMPs.

Parallel Decision Tree Software—Decision trees belong to the category of classification algorithms wherein the algorithm learns a function that maps a data item into one of several pre-defined classes. These algorithms typically have two phases. In the training phase, the algorithm is "trained" by presenting it with a set of examples with known classification. In the validation phase, the model created in the training phase is tested to determine how well it classifies known examples. If the results meet expected accuracy, the model is put into operation to classify examples with unknown classification. This operation is embarrassingly parallel as several "copies" of the classifier can operate on different examples. It is important for the training phase of the classifier to be efficient as Applicants need to find an optimum set of parameters, which will enable accurate and efficient results during the operation of the classifier.

A decision tree is a structure that is either a leaf, indicating a class, or a decision node that specifies some test to be carried out on a feature (or a combination of features), with a branch and sub-tree for each possible outcome of the test. The decision at each node of the tree is made to reveal the structure in the data. Decision trees tend to be relatively simple to implement, yield results that can be interpreted, and have built-in dimension reduction. Parallel implementations of decision trees have been the subject of extensive research in the last few years.

FIG. 1 is a flow chart 120 illustrating decision tree modules used in one embodiment of the present invention. The following modules are included in flow chart 120: module 121 to read data, module 122 to sort the data, module 123 to identify best split, and module 124 to split the data.

The first module reads the data from a file to main memory into separate feature lists for each feature. Each list contains the identification (ID) number of the data instance, the feature value, and the class associated with the instance. This module uniformly partitions the data among the processors. Once the data is read to memory, the sorting module decides whether to sort each numeric feature of the data depending on the options used in the next module that selects the best way to split data. If sorting is necessary, the sorting module performs a parallel sort on each feature list, which results in each processor containing a static, contiguous, sorted portion of the feature. Since all the features corresponding to one data instance may not belong to the same processor, it is important to include the ID number of the data instance in the feature list. The module that selects the best split of the data proposes splits, evaluates the splits using a splitting evaluation criterion, and chooses the best split according to the evaluation criterion. The module that splits the data uses the best split found by the previous module to split the data. The modules of finding the best split and splitting the data are repeated on any unsolved nodes.

FIG. 2 is a flow chart 130 illustrating steps used in a decision tree of one embodiment of the present invention. The following steps are included in flow chart 130: step 131 read the data, step 132 sort the data, step 133 identify the best split, and step 134 split the data.

The first step is to read the data from a file to main memory into separate feature lists for each feature. Each list contains the identification (ID) number of the data instance, the feature value, and the class associated with the instance. This data is partitioned uniformly among the processors. Once the data is read to memory, the sorting step decides whether to sort each numeric feature of the data depending on the options used in the next step that selects the best way to split data. If sorting is necessary, a parallel sort is performed on each feature list, which results in each processor containing a static, contiguous, sorted portion of the feature. Since all the features corresponding to one data instance may not belong to the same processor, it is important to include the ID number of the data instance in the feature list. The step that selects the best split of the data proposes splits, evaluates the splits using a splitting evaluation criterion, and chooses the best split according to the evaluation criterion. The step that splits the data uses the best split found in the previous step to split the data. The steps of finding the best split and splitting the data are repeated to any unsolved nodes.

An approach used to construct a scalable decision tree was first described in the SPRINT algorithm. Instead of sorting the features at each node of the tree as was done in earlier implementations, it uses a single sort on all the features at the beginning.

An improved version of the SPRINT algorithm that is scalable in both run-time and memory requirements is described in ScalParC. This differs from SPRINT in two ways. First, a distributed hash table is used, instead of a single hash table, which is replicated in each processor. This reduces memory requirements per processor, making the algorithm scalable with respect to memory. Second, as in SPRINT, the decision tree nodes are constructed breadth-first rather than depth-first and processor synchronization is held off until all work is done for that level of the tree. This not only limits the communication necessary for synchronization, but also results in better load balancing since processors that finish with one node of the tree can move directly on to the next node.

Applicants' goal in the design and implementation of the systems decision tree software is to take the ScalParC approach and extend it to include the following:

1) Support for several different splitting criteria: The feature to test at each node of the tree, as well as the value against which to test it, can be determined using one of several measures. Depending on whether the measure evaluates the goodness or badness of a split, it can be either maximized or minimized. Let T be the set of n examples at a node that belong to one of k classes, and $T_L$ and $T_R$ be the two non-overlapping subsets that result from the split (that is, the left and right subsets). Let $L_j$ and $R_j$ be the number of instances of class j on the left and the right, respectively. Then, the split criteria Applicants want to support include:

Gini: This criterion is based on finding the split that most reduces the node impurity, where the impurity is defined as follows:

$$L_{Gini} = 1.0 - \sum_{i=1}^{k}(L_i/|T_L|)^2, R_{Gini} = 1.0 - \sum_{i=1}^{k}(R_i/|T_R|)^2$$

Impurity=$(|T_L|*L_{Gini}+|T_R|*R_{Gini})/n$ where $|T_L|$ and $|T_R|$ are the number of examples, and $L_{Gini}$ and $R_{Gini}$ are the Gini indices on the left and right side of the split, respectively. This criterion can have problems when there are a large number of classes.

Twoing rule: In this case, a "goodness" measure is evaluated as follows:

$$\text{Twoing value} = (|T_L|/n)*(|T_R|/n)*\left(\sum_{i=1}^{k}|L_i/|T_L|-R_i/|T_R||\right)^2$$

Information Gain: The information gain associated with a feature is the expected reduction in entropy caused by partitioning the examples according to the feature. Here the entropy characterizes the (im)purity of an arbitrary collection of examples. For example, the entropy prior to the split in our example would be:

$$\text{Entropy}(T) = \sum_{i=1}^{k}-p_i\log_2 p_i, p_i = (L_i+R_i)/n$$

where $p_i$ is the proportion of T belonging to class i and $(L_i+R_i)$ is the number of examples in class i in T. The information gain of a split S relative to T is then given by $$\text{Gain}(T, S) = \text{Entropy}(T) - \frac{|T_L|}{|T|}\text{Entropy}(T_L) - \frac{|T_R|}{|T|}\text{Entropy}(T_R)$$

where $T_L$ and $T_R$ is the subset of S corresponding to the left and right branches respectively. This criterion tends to favor features with many values over those with few values.

Information Gain Ratio: To overcome the bias in the information gain measure, Quinlan suggested the use of information gain ratio which penalizes features by incorporating a term, called the split information, that is sensitive to how broadly and uniformly the feature splits the data.

Split Information $(T)=-(|T_L|/n)\log_2(|T_L|/n)-(|T_R|/n)\log_2(|T_R|/n)$ where $T_L$ are the subsets resulting from partitioning T on the c-valued feature F. Note that the split information is the entropy of T with respect to the splits S. The Gain ratio is then defined as Gain Ratio$(T)$=Gain$(T)$/Split Information$(T)$ Max Minority: This criterion is defined as $$L_{minority} = \sum_{i=1, i \neq \max L_i}^{k} L_i, R_{minority} = \sum_{i=1, i \neq \max R_i}^{k} R_i$$

Max minority=max $(L_{minority}, R_{minority})$

This has the theoretical advantage that a tree built by minimizing this measure will have depth at most log n. This is not a significant advantage in practice and trees created by other measures are seldom deeper than the ones produced by Max Minority.

Sum Minority: This criterion minimizes the sum of $L_{minority}$ and $R_{minority}$, which is just the number of misclassified instances.

2) Support for non-axis-parallel decision trees.

Traditional decision trees consider a single feature at each node, resulting in hyperplanes that are parallel to one of the axes. While such trees are easy to interpret, they may be complicated and inaccurate in the case where the data is best partitioned by an oblique hyperplane. In such instances, it may be appropriate to make a decision based on a linear combination of features, instead of a single feature. If we consider that the instances take the form $(x_1, x_2, \ldots, x_d, c_j)$, where the $x_i$ are real-valued attributes, and the $c_j$ is a discrete value that represents the class label of the instance. Applicants consider more general tests of the form $$\sum_{i=1}^{d} a_i x_i + a_{d+1} > 0,$$

where the $a_i$ are real-valued coefficients. In this case, the task of the tree inducer is much harder than before, because it involves searching in a (d+1)-dimensional space. It has been shown that finding the best oblique tree is NP-complete, and therefore existing oblique DT inducers use some sort of greedy search to find values for the coefficients.

However, these oblique trees can be harder to interpret. Nonetheless, Applicants early research has shown that when used in conjunction with evolutionary algorithms, these oblique classifiers could prove competitive in some cases. To further explore these ideas, Applicants are designing software such that, in addition to axis parallel trees, it can support the following types of splits at each node:

CART-LC: Breiman et al., suggested the use of linear combinations of features to split the data at a node. If the features for a data instance are given as $(x_1, x_2, \ldots, x_n, c)$, where c is the class label associated with the instance, then, Applicants search for a best split of the form $$\sum_{i=1}^{n} a_i x_i \le d \text{ where } \sum_{i=1}^{n} a_i^2 = 1$$

and d ranges over all possible values. The solution approach cycles through the variables $x_1, \ldots x_n$, trying to find the best split on each variable, while keeping the others constant. A backward deletion process is then used to remove variables that contribute little to the effectiveness of the split. This approach is fully deterministic and can get trapped in a local minimum.

OC1: The oblique classifier OC1 attempts to address some of the limitations of the CART-LC approach by including randomization in the algorithm that finds the best hyperplane. Further, multiple random re-starts are used to escape local minima. In order to be at least as powerful as the axis-parallel decision trees, OC1 first finds the best axis-parallel split at a node before looking for an oblique split. The axis-parallel split is used if it is better than the best oblique split determined by the algorithm for that node.

OC1 shifts to an axis-parallel split when the number of examples at a node falls below a user-specified threshold to ensure that the data does not underfit the concept to be learned.

OC1 uses an ad-hoc combination of hillclimbing and randomization. As in CART-LC, the hillclimber finds locally optimal values for one coefficient at a time, although OC1 offers several variants to choose the order in which the coefficients are optimized. The randomization component takes two forms: OC1 uses multiple random restarts, and when hillclimbing reaches a local minimum the hyperplane is perturbed in a random direction. Murthy et al. present OC1 as an extension of CART with linear combinations that overcomes some of its limitations. In particular, they claim that CART's deterministic nature may cause it to get trapped in local minima, and that using randomization may improve the quality of the DTs. In addition, OC1 produces multiple trees using the same data, and unlike CART, the time used at each node in the tree is bounded. They present experimental results that suggest that OC1 outperforms CART in several domains.

Heath used simulated annealing to perturb the hyperplane's coefficients. Simulated annealing is a more sophisticated optimizer than those used in CART and OC1, and in some domains it can produce small and highly accurate trees. However, simulated annealing converges very slowly, and the DT inducer has to examine a large number of hyperplanes, making it inadequate for large data sets.

Oblique-EA: In this approach, Applicants use evolutionary algorithms to find the best hyperplane represented by the coefficients $(a_1, \ldots, a_n, d)$. An individual in the population is represented by the concatenated version of these coefficients. The fitness of each individual is determined by evaluating how well it splits the examples at a node for a given split criterion. Evolutionary algorithms thus allow us to work with all the coefficients at a time instead of considering one variable at a time as in in OC1 and CART-LC.

Evolutionary algorithms are a promising alternative to existing oblique tree algorithms for several reasons:

More sophisticated optimizers—EAs are not limited to considering one coefficient at a time (unlike CART and OC1), and it is likely that EAs find better splits than the simple greedy hillclimbers that are currently in use.

No need for optimal splits—Finding the best split at each node does not guarantee that the best tree will be found. Therefore, there is no need to run the EAs (or any other optimizer, for that matter) until they find the best solution that they can. It is well known that EAs quickly improve on the initial solutions, and so Applicants may use the best hyperplanes found after just a few iterations.

Scalability to high dimensional spaces—The dimension of the search space is defined by the number of attributes that describe each instance. In practice this can be a large number, and the execution time of some existing DT algorithms may not scale up well. In contrast, EAs have been shown to have good scalability properties.

Use of problem-specific knowledge—There are numerous opportunities to incorporate knowledge about the DT inducing problem into the EAs. For instance, real-valued encodings and operators seem natural to represent hyperplanes. The positive experiences with existing DT inducers suggest that new hyperplanes that are only slight variations of the originals may work well. This can be accomplished by restricting recombination between similar hyperplanes or by using small mutation steps, for example. In addition, the execution time may be reduced using known 'good' solutions to seed the initial population.

Hybridization—Most DT algorithms use a local optimizer that is well tuned to the tree induction task, and interfacing it to the EA could boost performance significantly.

Tolerance to noise—More efficient EA-based DT inducers may be obtained by approximating the fitness of a hyperplane by using a small random sample of instances to evaluate the split. This approximation would assign different fitness values to the same hyperplane every time that it is evaluated, but EAs are tolerant to such noisy fitness evaluations.

Parallel implementations—It is straightforward to implement EAs on parallel computers, and the expected performance improvements are very promising.

Applicants use knowledge about the problem in their choice of encoding and operators and to seed the initial population. The EAs were run for a fixed number of iterations that, in many cases, were not enough for the EA to converge to a unique solution or to find the best hyperplane that it could, but that were sufficient to reach acceptable solutions. In addition, Applicants performed experiments to explore the scalability of EAs and their sensitivity to sampling.

Applicants have explored two options for evolutionary algorithms, although other options are possible. In one case Applicants use a (1+1) evolution strategy with self-adaptive mutations. Applicants call this OC1-ES. The candidate hyperplane is represented as a vector of real-valued coefficients, $a_1, \ldots, a_{d+1}$. The initial hyperplane is the best axis-parallel split found by OC1. For each hyperplane coefficient there is a corresponding mutation coefficient $a_1, \ldots, a_{d+1}$, which are initially set to 1. At each iteration, t, the mutation coefficients are updated and a new hyperplane is obtained according to the following rule:

$$v = N(0, 1)$$

$$\sigma_i^{t+1} = \sigma_i^t \exp(\tau' v + \tau N(0, 1))$$

$$a_i^{t+1} = a_i^t + \sigma_i^{t+1} N(0, 1)$$

where N(0,1) indicates a realization of a unit normal variate, $\tau=(\sqrt{2\sqrt{d}})^{-1}$, and $\tau'=(\sqrt{2d}^{-1})$. The ES was stopped after 1000 iterations. The second extension of OC1 with an EA uses a simple generational GA with real-valued genes, and is called OC1-GA. For the experiments, the GA used pairwise tournament selection without replacement, uniform crossover with probability 1.0, and no mutation. The population size was set to $20\sqrt{d}$, along the lines of a population-sizing theory that proposes that the population size required to reach a solution of a particular quality is $O(\sqrt{d})$. The best axis-parallel hyperplane was copied to 10% of the initial population, and the remainder of the population was initialized randomly with coefficients $a_1$ in [−200,200]. The GA was stopped after 25 generations. The user of the system can change the parameters and constants described above.

Applicants initial experiments have shown that in some cases, the Oblique-EA approaches are faster and more accurate than OC1.

3) Support for Both Numeric and Nominal Features.

4) Support for Different Pruning Options and Stopping Criteria. Applicants are interested in exploring different ways to avoid over-fitting through pruning and rules that decide when to stop splitting, such as the cost complexity pruning technique of Breiman or the minimum description length approach suggested by Quinlan and Rivest.

The Sapphire Decision Tree Design—Applicants are interested in a decision tree design that provides enough flexibility to experiment with different options within a parallel implementation. It is relatively easy to support some of these options within the context of an object-oriented design. For example, different splitting criteria can be supported easily by having an abstract base class from which concrete classes for the split criterion are inherited. These concrete classes implement the function used to determine the quality of a split. The user can then instantiate an object in one of these classes to indicate the split criterion used at all nodes of the tree. This choice would be communicated to the decision tree object by passing a pointer to the base split criteria class as an argument. A similar situation holds in the case of pruning options, which are executed after the tree is built. In both cases, the main operation performed by the class is at a low-enough level that no parallelism is required in the implementation of the operation.

FIG. 3 is the UML Class Diagram for decision trees.

The prefix di_ is used to indicate classes that contain domain information, and dt_ to indicate classes used in the decision tree. Note that the di_ classes can be used in other classification and clustering algorithms, not just decision trees. A brief description of the classes is as follows:

di_FeatureValue: This contains either a nominal (discrete) feature or a numeric (continuous) feature, but never both at the same time.

di_InstanceInfo: This contains the number of features, the name of the features and their type (numeric or nominal) for a data instance.

di_Instance: This contains the features for a data instance. It can contain an arbitrary number of objects of class di_FeatureValue. It is typically used in conjunction with di_InstanceInfo.

di_InstanceArray: This can be used for the training set, where each data instance has several features or for the feature lists that contain only a single feature and are created in the first part of the parallel decision tree. An object of class di_InstanceArray can contain an arbitrary number of objects of class di_Instance.

dt_SplittingCriterion: This abstract base class represents the criterion to be used to evaluate the split at each node. The derived classes denote the value that is returned after an evaluation of a split. As Applicants find new ways of judging a split, a new class can be derived from the base class to implement that split criterion. In the current embodiment, the same split criterion is used in the entire decision tree.

dt_SplitFinder: This base class represents the approach used to find the split—whether axis-parallel, oblique, CART-LC, etc. Derived classes implement the actual determination of the split. The SplitFinder used at any node of the tree may vary depending on several factors. For example, if the instances at a node are few, an axis parallel approach may be chosen instead of an oblique one. Or, evaluation of an oblique split may indicate that an axis-parallel split is a better choice for the data at a node. Regardless of the choice of SplitFinder, the user can independently select the split criterion used to evaluate the split. It is possible to exploit parallelism within the SplitFinder class.

dt_TreeNode: This class contains the information on a node of the tree. It includes pointers to the InstanceArrays stored using a single feature at a time, the left- and right-hand sides of the split made at the node, the type of SplitFinder, the count statistics for each feature, and pointers to the children dt_TreeNodes created by the split. Once the split is determined using the SplitFinder, the TreeNode object is responsible for actually splitting the instances among the children node. Parallelism can be exploited within this class.

dt_DecisionTree: This is the main class that creates, tests, and applies the tree. It can also print out the tree, save it to a file, and read it back from a file. Starting with a root TreeNode that contains the entire training set, it creates the child nodes by choosing the appropriate SplitFinder, using the SplitCriterion set by the user. The single sort that is required by the parallel implementation is done at the beginning of the training of the decision tree. Parallelism is exploited within this class.

One of the challenges Applicants face in supporting several different options in parallel decision tree software is that the approach taken for efficient implementation of one option could directly conflict with the efficient implementation of another option. An interesting case of this arises in the SplitFinder class. The ScalParC approach, which generates axis-parallel trees, sorts each feature at the beginning of the creation of the tree. As mentioned earlier, the sort spreads the features that comprise a single data instance across more than one processor. However, for oblique classifiers, in order to evaluate a split, all features in a data instance are needed. If these features were spread across processors, communication would be required. This communication could very likely have an irregular pattern and, depending on how the features corresponding to a data instance are spread out among the processors, could be extensive. This would suggest that to support oblique splits, Applicants should not sort each of the features prior to the creation of the decision tree. However, regardless of the technique used to calculate an oblique split, Applicants still need to evaluate axis-parallel splits. For example, an oblique split starts with an axis parallel split, is compared with an axis parallel split in order to select the better of the two, and determines an axis-parallel split for each coefficient at a time, keeping the others constant.

This gives rise to an interesting dilemma—should Applicants sort each feature at the beginning or not? It is always possible to have two sets of features, one sorted and the other unsorted, even though it would almost double the memory requirements. The other option is to work with only one set of features, but should Applicants picked the sorted or the un-sorted one? Since sorting would result in extensive communication in the case of oblique splits, a possible solution approach would be to see if Applicants could somehow mimic the axis-parallel split efficiently on unsorted data.

To determine the best axis parallel split, Applicants first sort the values for a feature, and then determine the value of a split if the split point was taken mid-way between two consecutive feature values. The best split across all features is chosen as the best split at a node. Instead of this approach, Applicants generate a histogram for each of the features, Applicants can select as a split value the boundary value of each bin in the histogram. If the histogram kept track of the count statistics for each class in a bin, Applicants could use this information to select the best split based on any splitting criterion. If the bin widths are chosen appropriately, this could give a good approximation to the axis-parallel split.

A different issue Applicants need to address in the parallelization of decision trees is the implementation on clusters of SMPs, where Applicants may need to use both distributed and shared memory programming. This could be most beneficial in the case where Applicants use genetic algorithms to search for the best oblique hyperplane, as genetic algorithms tend to be expensive to implement. This would give rise to some interesting solution approaches. Suppose the data instances with unsorted features are distributed uniformly across the nodes of a parallel system. Then the SMP processors within each node could work on finding the best oblique hyperplane for its set of data instances, while occasionally exchanging members with other nodes in order to find a hyperplane that best splits the entire set of data instances.

The results of our tests show that the EA-augmented inducers can quickly find competitive classifiers, and that they scale up better than traditional oblique DT inducers to the size of the training sets and to the number of attributes that describe each instance. A brief background on oblique decision trees is included and a brief review of relevant previous work describes some of the advantages of using EAs to find splits in oblique DTs, and describes Applicants approach to this problem. Tests have provided results that illustrate the advantages of the evolutionary approach using public domain and artificial data sets.

EXPERIMENTS—To demonstrate the feasibility of using EAs to search for oblique partitions, Applicants conducted three sets of experiments. In the first set, Applicants used the same four public-domain data sets from the UCI repository used to evaluate OC1. Next, applicants used artificial data with known properties, and Applicants performed experiments to study the scalability of the different algorithms to the dimensionality of the domain. Finally, Applicants present experiments with a larger database to illustrate how sampling may help to scale up the evolutionary approach to more realistic situations.

The experiments compare the performance of three baseline DT inducers against two inducers that use EAs. The first baseline DT system is OC1 with its default parameters; the second is OC1 limited to axis-parallel partitions, which Applicants call OC1-AP; and the third is implementation of CART-LC, which Applicants call OC1-CART.

The execution times were measured on a 500 MHz Pentium III PC with 128 Mb of RAM running NT 4.0. The programs were compiled with the ecgs compiler version 2.91 using –O optimizations.

All experiments measure the impurity of a split at each tree node using the twoing rule, which is the default in OC1.

TABLE 1

Descriptions of the small public domain data sets used in the experiments.

| Name | Task Description | Attributes | No. of Instances |
|---|---|---|---|
| Cancer | Diagnose a tumor as benign or malignant | 9 | 683 |
| Diabetes | Detect presence of diabetes | 8 | 768 |
| Housing | Predict housing values in suburbs of Boston | 12 | 506 |
| Iris | Classify type of iris | 4 | 150 |

TABLE 2

Comparison of different algorithms on the small public domain data sets

| Algorithm | Parameter | Cancer | Diabetes | Housing | Iris |
|---|---|---|---|---|---|
| OC1 | Accuracy | 96.2 (1.0) | 74.1 (2.0) | 82.8 (2.0) | 95.5 (1.8) |
|  | Leaves | 3.3 (1.1) | 5.7 (2.1) | 7.3 (2.6) | 3.5 (0.2) |
|  | Time | 28.4 (8.7) | 33.0 (1.4) | 19.8 (1.3) | 1.2 (0.1) |
| OC1-AP | Accuracy | 94.7 (0.7) | 74.0 (1.0) | 82.2 (1.0) | 92.8 (2.6) |
|  | Leaves | 9.4 (2.6) | 18.9 (8.7) | 10.0 (6.6) | 5.2 (1.4) |
|  | Time | 0.2 (0.0) | 0.4 (0.0) | 0.3 (0.0) | 0.1 (0.0) |

TABLE 2-continued

Comparison of different algorithms on the small public domain data sets

| Algorithm | Parameter | Cancer | Diabetes | Housing | Iris |
|---|---|---|---|---|---|
| OC1-CART | Accuracy | 95.9 (0.5) | 72.7 (1.8) | 82.3 (1.5) | 94.2 (1.8) |
| | Leaves | 5.5 (2.5) | 13.7 (7.8) | 11.5 (2.8) | 4.2 (0.7) |
| | Time | 1.2 (0.2) | 2.7 (0.1) | 2.1 (0.1) | 0.1 (0.1) |
| OC1-ES | Accuracy | 95.2 (0.9) | 73.7 (1.4) | 82.8 (1.2) | 96.3 (1.5) |
| | Leaves | 5.2 (2.2) | 17.1 (5.0) | 11.5 (5.7) | 3.5 (0.4) |
| | Time | 5.1 (0.4) | 14.0 (0.3) | 8.6 (0.3) | 0.9 (.1) |
| OC1-GA | Accuracy | 94.3 (0.5) | 73.9 (1.3) | 82.4 (1.1) | 93.6 (1.3) |
| | Leaves | 9.6 (2.1) | 19.0 (11.6) | 12.5 (5.2) | 4.3 (1.4) |
| | Time | 7.7 (0.4) | 13.0 (0.3) | 8.5 (0.4) | 0.37 (0.04) |

SMALL DATA SETS—The first round of experiments use small public domain data sets, which are available at UCI's machine learning repository. These are briefly described in Table 1, and have been used in numerous studies of machine learning and data mining algorithms. For comparison Applicants followed the experimental procedure used to compare OC1 to other DT inducers: Applicants use the standard parameters of OC1, and the results presented (in Table 2) are the average of ten five-fold cross-validation experiments (50 trees total). Applicants report the percentage of instances classified correctly, the size of the tree measured by the number of leaves, and the execution time of the program measured in seconds, along with their standard deviations (in parenthesis).

From the table it is clear that for a given dataset the differences in the accuracy of the algorithms is very small. There are statistically significant differences (at least at the 0.05 confidence level) on the cancer and iris data, but the magnitude of the differences is still small. For the four data sets, OC1 found the smallest trees, but in three cases (cancer, housing, and iris) OC1-ES and OC1-CART found trees comparable to OC1. The average size of the trees found by the GA-augmented inducer was close to the axis-parallel algorithm. The largest differences are in execution times; the EAs being on average approximately 3 times faster than OC1, but much slower than OC1-AP and OC1-CART.

ARTIFICIAL DATA—The next set of experiments used three artificial data sets. The purpose of these experiments is to ensure that the concept to be learned matches the bias of the algorithms—the classes are separable by oblique hyperplanes. In addition, Applicants performed experiments to explore the scalability of the algorithms as the number of attributes varies. The three data sets were also used in evaluation of OC1, but Applicants used them to study different properties of the algorithms.

The first artificial data set has 2000 instances divided into two classes. Each instance has d attributes whose values are uniformly distributed in [0,1]. The data is separable by the hyperplane $x_1 + \ldots + x_{d/2} < x_{d/2+1} + \ldots + x_d$, where $d \in \{10, 20, 50\}$. These data sets are labeled LS10, LS20, and LS50 according to their dimensionality.

Applicants followed the same experimental procedure as in the previous experiments, and the results are summarized in Table 3. In this case, OC1-AP consistently found the least accurate and largest trees. Of course, it was the fastest algorithm, but its accuracy is too low to consider AP trees competitive (consider that random guessing would result in a 50% accuracy and the accuracy of OC1-AP on LS50 is 58%). OC1 produces the most accurate trees for LS10, but as the number of dimensions increases its performance seems to drop below the EA-augmented inducers. OC1-CART does a little worse. OC1-GA maintains the highest accuracy, but its execution time seems to increase faster than OC1-ES. In any case, both of the EA inducers are faster than OC1 (approximately between 2× and 6×), and appear to be more robust to the increase in dimensionality. The size of the trees found by OC1, OC1-CART, and OC1-ES increases with the number of dimensions, but those of OC1-GA seem to remain of a constant size. However, consider that the ideal tree for this domain has two leaves, and all the algorithms find much larger trees.

TABLE 3

Comparison of different algorithms on the artificial data sets.

| Algorithm | Parameter | LS10 | LS20 | LS50 | POL2 | RCB2 |
|---|---|---|---|---|---|---|
| OC1 | Accuracy | 97.1 (0.4) | 88.5 (1.1) | 72.5 (1.3) | 99.6 (0.1) | 99.0 (0.1) |
| | Leaves | 5.3 (2.2) | 5.9 (2.7) | 10.0 (3.6) | 5.0 (0.0) | 8.4 (0.3) |
| | Time | 170.9 (12) | 391.5 (16.6) | 608.7 (32.8) | 36.0 (2.3) | 44.8 (1.5) |
| OC1-AP | Accuracy | 73.0 (1.5) | 64.6 (0.8) | 58.6 (1.0) | 94.2 (0.6) | 92.8 (0.6) |
| | Leaves | 86.7 (16.6) | 71.5 (29.0) | 58.0 (20.8) | 77.7 (10.4) | 85.9 (6.8) |
| | Time | 1.6 (0.0) | 3.5 (0.1) | 11.7 (0.6) | 0.3 (0.0) | 0.4 (0.0) |
| OC1-CART | Accuracy | 96.0 (1.5) | 87.3 (1.9) | 66.3 (1.0) | 97.6 (0.5) | 94.4 (0.3) |
| | Leaves | 5.9 (3.5) | 9.3 (3.6) | 25.0 (17.7) | 14.4 (2.9) | 50.6 (7.1) |
| | Time | 16.8 (1.3) | 54.9 (3.6) | 113.9 (3.6) | 2.7 (0.2) | 3.4 (0.1) |
| OC1-ES | Accuracy | 93.7 (0.8) | 87.0 (1.0) | 78.5 (1.6) | 99.4 (0.3) | 98.1 (0.3) |
| | Leaves | 9.9 (2.8) | 14.4 (5.6) | 16.3 (9.4) | 6.3 (1.2) | 10.9 (1.9) |
| | Time | 29.8 (2.4) | 65.1 (3.3) | 163.9 (14.9) | 4.5 (0.4) | 6.0 (0.4) |
| OC1-GA | Accuracy | 95.4 (0.6) | 92.0 (0.7) | 85.2 (1.0) | 95.3 (0.4) | 93.8 (0.7) |
| | Leaves | 8.8 (3.8) | 9.8 (5.9) | 9.5 (5.6) | 57.5 (10.5) | 64.6 (9.7) |
| | Time | 36.3 (3.8) | 101.5 (4.8) | 333.3 (22.2) | 4.7 (0.3) | 5.0 (0.2) |

The second and third artificial data sets, POL2 and RCB2, represent concepts that are supposed to be more difficult to learn than the LS problems. POL2 and RCB2 are defined in 2 dimensions ($x_1, x_2 \in [0,1]$), and depicted in FIG. 1. The concept represented by the POL2 data is a set of four parallel oblique lines (hence its name), it contains 2000 instances divided into two classes. The "rotated checker board" (RCB2) data also has 2000 instances, but in this case they are divided into eight classes. Applicants used the same experimental setup as before, and the results are in Table 3.

In these two domains, OC1 and OC1-ES produced the most accurate and smallest trees. The smallest trees for POL2 and RCB2 have five and eight leaves, respectively, and OC1 consistently found trees of those sizes. As expected, the AP trees are the largest and least accurate, but OC1-GA found only slightly more accurate and smaller trees. The fastest oblique DT algorithm was OC1-CART, but its accuracy is lower than OC1 and OC1-ES. Both of the EA inducers were approximately eight times faster than OC1, but in these two problems the overall performance of the ES was much better than the GA.

OPTICAL DIGIT RECOGNITION DATA—To study the problem of scalability to larger data sets, Applicants experimented with the optical digit recognition data set, which is also available at UCI's ML repository. This data set has 3823 instances in a training set and 1797 in a testing set; each instance is described by 64 numeric attributes. The objective is to identify the instances as one of 10 digits.

With this domain, Applicants illustrate a more realistic application of EAs to the problem of oblique DT induction. The larger size of the training set could cause fitness evaluations to be prohibitively expensive, and therefore Applicants seek to obtain faster approximate evaluations by sampling the training set. Applicants consider two ways of sampling. The first is a preprocessing step in which the training set is sampled once at the beginning of an experiment. This static sampling ignores all the instances that were not selected originally, possibly wasting valuable information. However, static sampling is valuable because it simulates a situation when not much data is available for training, which is often the case in scientific domains. The second way of sampling is to choose a fraction of the training instances every time that a hyperplane is evaluated. This dynamic sampling method is slightly more expensive than sampling statically once per experiment, but it may be advantageous especially when samples are small, because numerous hyperplanes are evaluated in every tree node and the sampling will eventually consider all the available labeled instances. Evaluating the hyperplanes with dynamic samples also means that every time that a particular hyperplane is evaluated its fitness estimate is different. Repeated evaluations of the same hyperplane would enable us to better estimate its true fitness (e.g., by taking the average of multiple evaluations), and some recent theory could be used to determine the optimal number of repetitive evaluations that would minimize the execution time. As a first cut, however, Applicants decided to use a single evaluation as a crude (but fast) estimate of fitness.

TABLE 4

Comparison of different algorithms on the digit recognition data sampling dynamically (5%–100\% of the training set) every time that a hyperplane was evaluated.

| Algorithm | Parameter | 5% | 10% | 25% | 50% | 100% |
|---|---|---|---|---|---|---|
| OC1 | Accuracy | 37.9 (4.4) | 50.2 (2.6) | 69.6 (2.0) | 81.2 (1.7) | 86.4 (0.9) |
|  | Leaves | 72.3 (19.5) | 101.8 (22.8) | 155.4 (90) | 182.1 (83.1) | 53.7 (30.6) |
|  | Time | 8.1 (0.3) | 16.2 (0.5) | 52.1 (2.9) | 126.6 (4.0) | 298.6 (11.1) |
| OC1-AP | Accuracy | 71.8 (1.1) | 76.9 (2.3) | 81.2 (1.6) | 83.0 (1.2) | 84.5 (1.9) |
|  | Leaves | 32.0 (5.6) | 49.0 (6.4) | 77.6 (11.5) | 112.1 (40.7) | 125.8 (48.2) |
|  | Time | 0.7 (0.0) | 0.9 (0.0) | 1.7 (0.0) | 2.9 (0.1) | 5.5 (0.2) |
| OC1-CART | Accuracy | 28.3 (4.4) | 36.9 (6.9) | 62.3 (4.5) | 75.1 (2.7) | 88.2 (0.7) |
|  | Leaves | 61 (56.6) | 158 (64.3) | 179 (116) | 163 (96.8) | 60.6 (25.8) |
|  | Time | 7.3 (0.6) | 11.8 (1.1) | 26.7 (3.2) | 62.1 (9.0) | 77.4 (10.7) |
| OC1-ES | Accuracy | 71.1 (2.4) | 77.5 (2.3) | 82.9 (1.9) | 84.7 (1.3) | 87.9 (1.0) |
|  | Leaves | 19.1 (3.8) | 26.6 (7.2) | 43.4 (13.0) | 84.0 (28.4) | 84.0 (37.6) |
|  | Time | 5.8 (0.4) | 8.7 (0.6) | 17.6 (0.4) | 32.7 (1.4) | 63.0 (3.2) |
| OC1-GA | Accuracy | 78.1 (2.0) | 82.7 (1.4) | 87.2 (0.9) | 88.6 (1.1) | 90.2 (1.1) |
|  | Leaves | 14.7 (4.2) | 20.0 (5.5) | 33.0 (9.2) | 31.9 (12.0) | 52.3 (34.6) |
|  | Time | 8.4 (0.5) | 15.2 (0.5) | 37.1 (0.9) | 75.6 (2.9) | 144.2 (4.5) |

The results with dynamic sampling are reported in Table 4. In this case, Applicants report the average of 10 experiments, and training and testing used the partition of the instances as in the UCI repository. The algorithms use the same parameters as before. Sampling decreases the execution time as desired, but it also affects the accuracy. For each sample size, the GA finds the smallest and most accurate classifiers, and in most cases it is faster than the original oblique OC1. The ES is the fastest of the oblique classifiers, and its accuracy is better than OC1 and CART, but not as good as the GA. Note, however, that the axis-parallel OC1 is the fastest algorithm, and that its accuracy is similar to OC1-ES. In fact, using OC1-AP with the entire data set is faster and more accurate than the GA on 5% samples, so if the end user does not care about the relatively small differences in accuracy, in this domain axis-parallel DTs would be a good choice. If accuracy or tree size is a premium, then OC1-GA would be the best option.

In separate experiments Applicants found that dynamic sampling gives more accurate results than sampling statically at the beginning of the experiments. For static samples of 25% or more of the training set, the accuracy was only slightly lower than with dynamic sampling (≈4–5%), but for smaller static samples, the accuracy was between 6 to 22% lower. The general trends were the same as with repetitive sampling, so Applicants omit those results.

Traditional DT inducers use some form of heuristic greedy search to find appropriate splits. Applicants substitute the greedy search with two evolutionary algorithms: a (1+1) evolution strategy and a simple GA. Applicants performed experiments on public domain and artificial data sets with different characteristics to evaluate the performance of the EA-based tree inducers. The results suggest that EAs are capable of finding oblique trees with similar accuracy to OC1, and that this can be done at a competitive cost. The experiments also suggest that the EAs scale up better than traditional methods to the dimensionality of the data.

Figure 4:
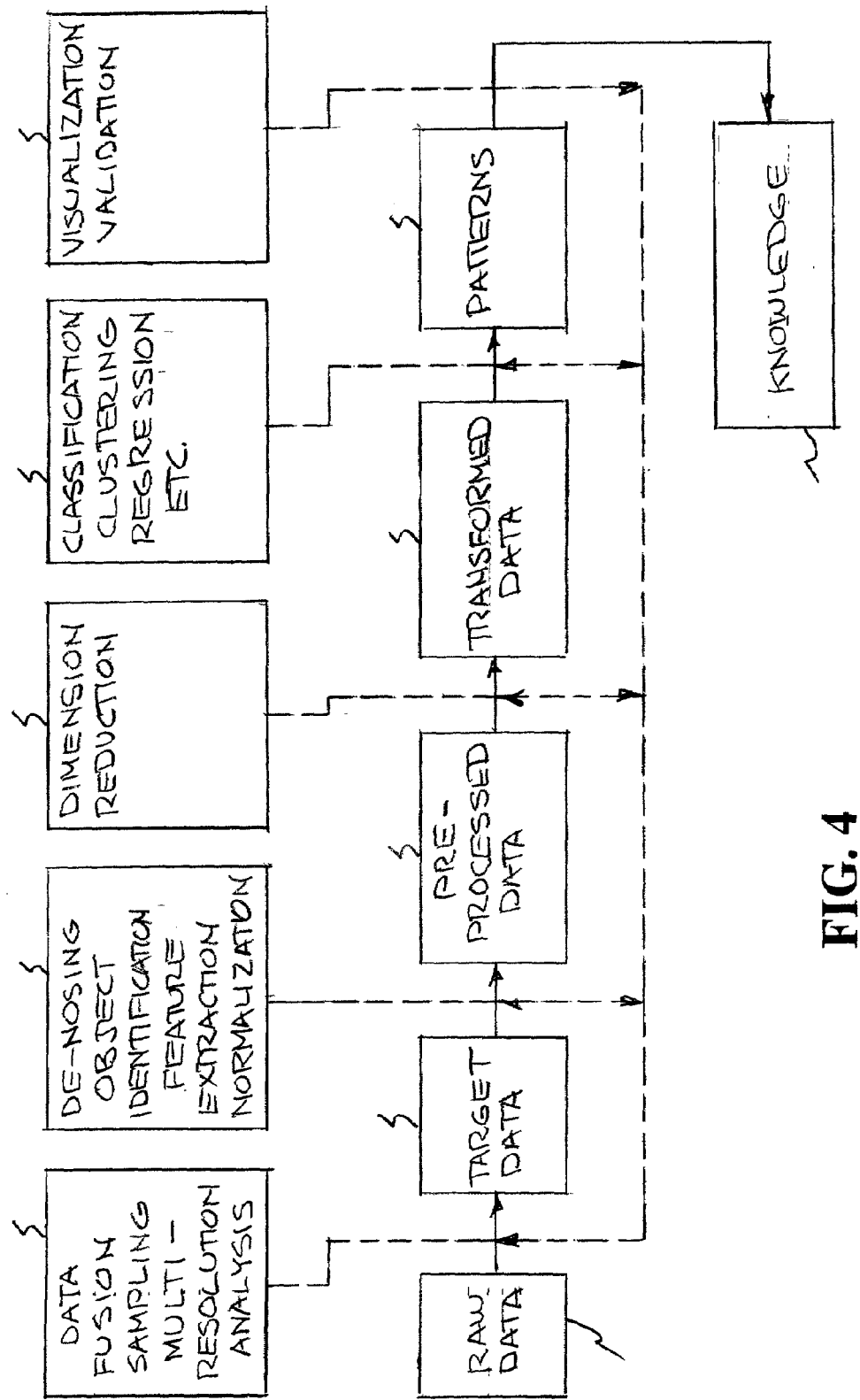
FIG. 4 is a flow chart illustrating that the data mining process is iterative and interactive.

Referring now to FIG. 4, a data mining system incorporating an embodiment of the present invention is illustrated. Data mining starts with the raw data and includes extensive pre-processing as illustrated in FIG. 4. If the raw data is very large, the embodiment of the present invention may use sampling and work with fewer instances, or use multiresolution techniques and work with data at a coarser resolution. This first step may also include data fusion, if required. Next, noise is removed, objects are identified, and relevant features for each object are extracted from the data. At the end of this step, a feature vector is crated for each data instance. Depending on the problem and the data, the number of features may need to be reduced using dimension reduction techniques such as principal component analysis (PCA) or its non-linear versions. After this pre-processing, the data is ready for the detection of patterns. These patterns are then displayed to the user, who validates them appropriately.

As shown in FIG. 4, the data mining process is iterative and interactive; any step may lead to a refinement of the previous steps. User feedback plays a critical role in the success of data mining in all stages, starting from the initial description of the data, the identification of potentially relevant features and the training set (where necessary), and the validation of the results.

The development of the data mining system incorporating an embodiment of the present invention required consideration of the design of the system. In order to implement the data mining process in a parallel setting as illustrated in FIG. 4, some considerable thought was given to the system's design. Applicants' experience has shown that a good design should take into account the following: (1) Not all problems require the entire data mining process, so each of the steps should be modular and capable of stand-alone operation. (2) Not all algorithms are suitable for a problem, so the software should include several algorithms for each task, and allow easy plug and play of these algorithms. (3) Each algorithm typically depends on several parameters, so the software should allow user friendly access to these parameters. (4) Intermediate data should be stored appropriately to support refinement of the data mining process. (5) The domain dependent and independent parts should be clearly identified to allow maximum re-use of software as we move from one application to another.

Figure 5:
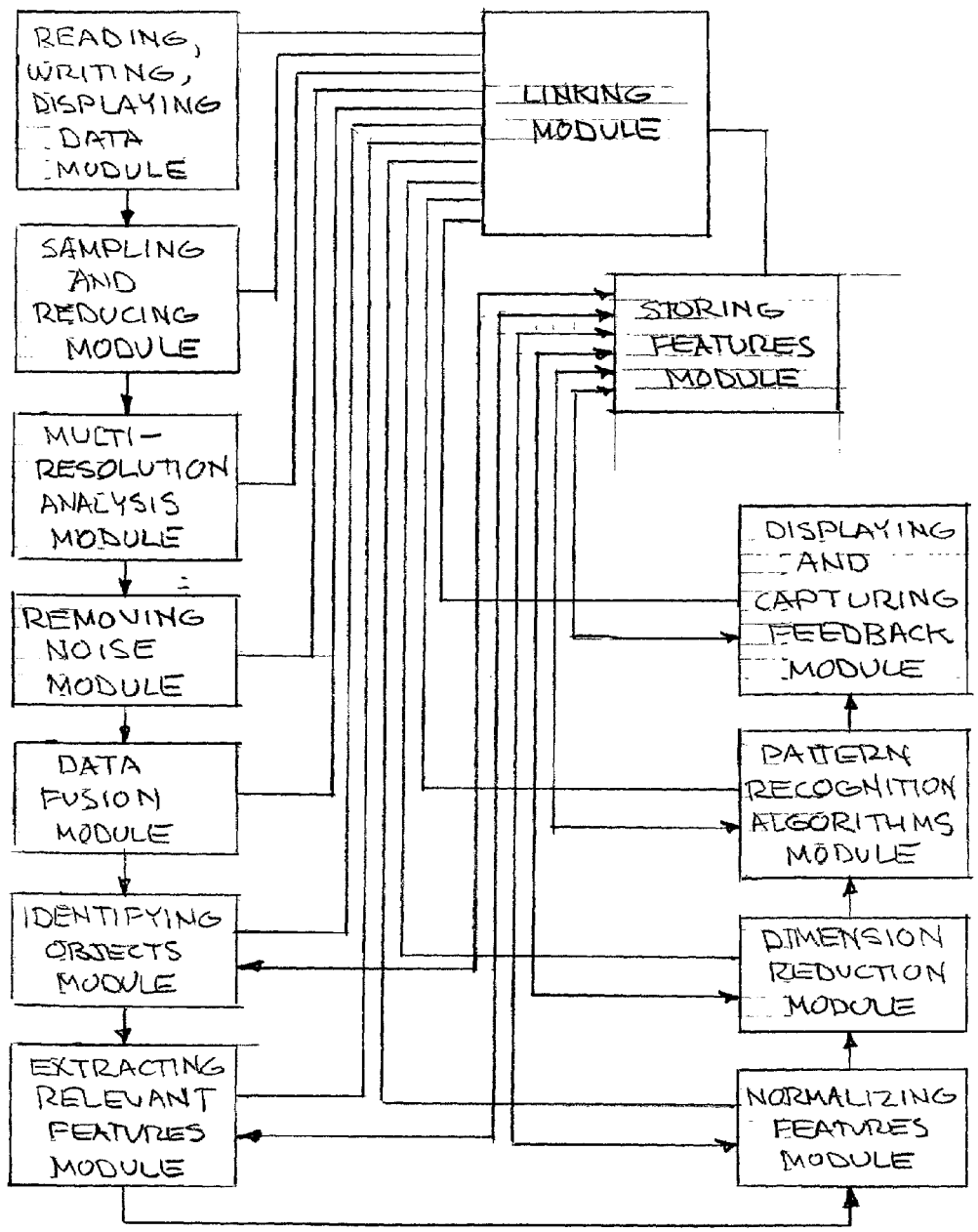
FIG. 5 is a flow chart showing basic modules of a data mining system that incorporates an embodiment of the present invention.

FIG. 5 is a flow chart 60 showing the basic modules of a data mining system incorporating an embodiment of the present invention. The individual modules of the flowchart 60 shown in FIG. 5 include the following (It is to be understood that not all of the modules are used in individual embodiments of the invention): parallel object-oriented module 62 for reading, writing, displaying data files; parallel object-oriented module 64 for sampling said data files to reduce the number of said data files; parallel object-oriented module 66 for multi-resolution analysis to perform a reversible transformation into a coarser resolution of said data files; parallel object-oriented module 68 for removing noise from said data files; parallel object-oriented module 70 for data fusion of said data files; parallel object-oriented module 72 for identifying objects in the said data files; parallel object-oriented module 74 for extracting relevant features for each of said objects; parallel object oriented module 76 for normalizing said features; parallel object-oriented module 78 for dimension reduction (reducing the number of said features of said objects); parallel object-oriented module 80 for pattern recognition algorithms; parallel object-oriented module 82 for displaying said data files and said objects and capturing feedback from scientists for validation; storing features module 84 for storing the features for each of said objects, after they have been extracted in module 72, reduced in number in module 76, used for pattern recognition in module 78, and displayed in module 82; and module 86 for linking the parts of the data mining system.

Figure 6:
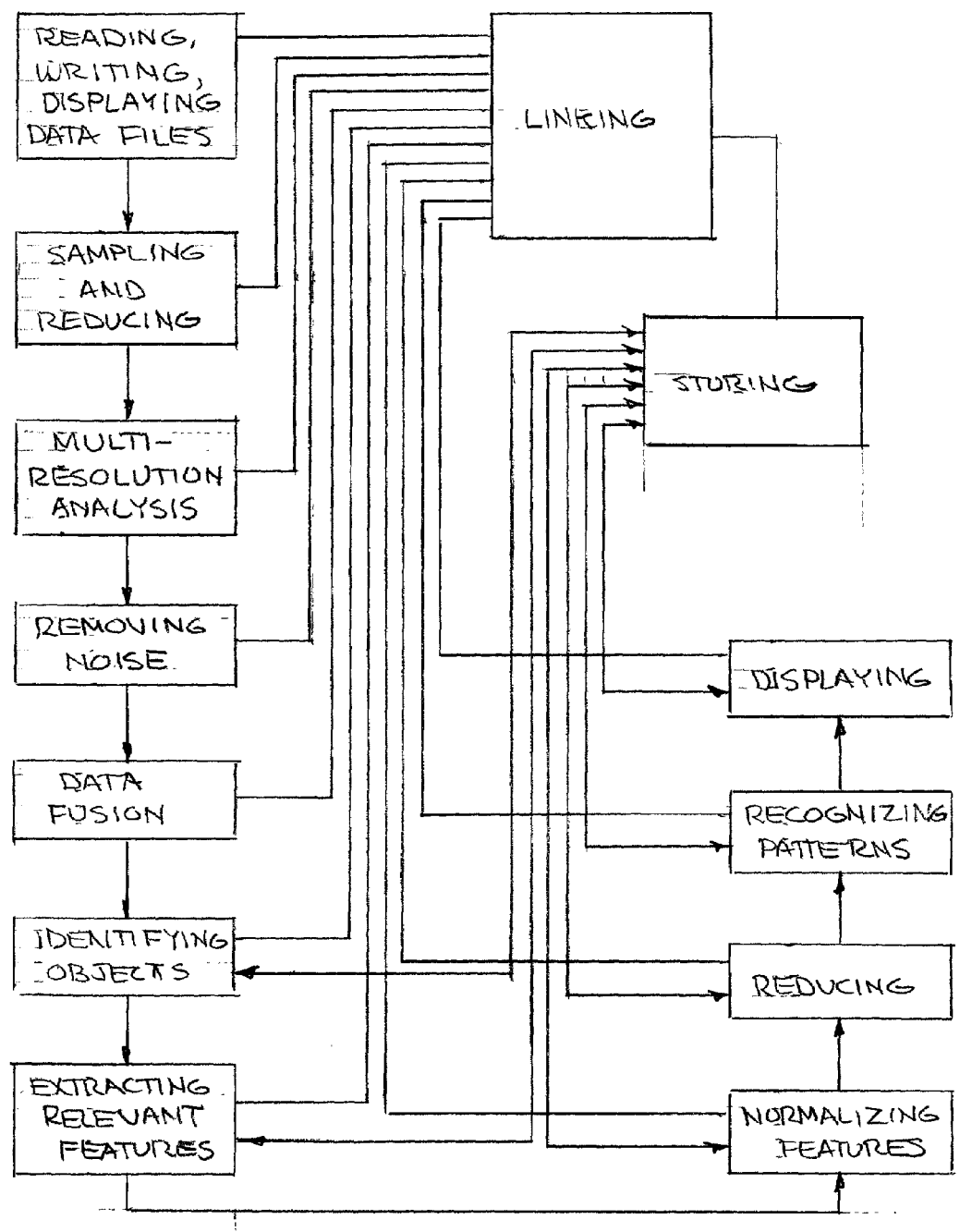
FIG. 6 is a flow chart showing basic steps of modules of a data mining system that incorporates an embodiment of the present invention.

FIG. 6 is a flow chart 90 showing the basic steps of a data mining method that incorporates an embodiment of the decision tree method of the present invention. The steps shown in FIG. 6 include the following: reading, writing, displaying data files step 92; sampling said data files and reducing the number of said data files step 94; multi-resolution analysis to perform a reversible transformation into a coarser resolution of said data files step 96; removing noise from said data files step 98; data fusion of said data files step 100; identifying objects in the said data files step 102; extracting relevant features for each of said objects step 104; normalizing the said features of the said objects step 106; reducing the dimension or number of said features of said objects step 107; recognizing patterns among said objects using said features step 108; displaying said data files and said objects and capturing feedback from scientists for validation step 110; storing the said features for each of said objects, after they have been extracted in step 104, reduced in number in step 106, used for pattern recognition in step 107, and displayed in step 110; and linking the parts of the data mining system step 114.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A decision tree based data mining system for processing data; comprising:
  a multiplicity of processors,
  an object oriented pattern recognition algorithms module for pattern recognition, comprising:

a multiplicity of data files,
a decision tree system including
an object oriented module operatively connected to said processors and connected to said data files to read said data and partition said data files among said multiplicity of processors,
an object oriented module operatively connected to said processors to parallel sort said data using said multiplicity of processors, if sorting is necessary,
an object oriented module operatively connected to said processors to determine the best manner to split said data according to some criterion wherein said criterion is the twoing rule, and
an object oriented module operatively connected to said processors to split said data, and
a data mining system, having
a storage module, and
an object oriented linking module for linking said decision tree system and said storage module.

2. A decision tree based data mining system for processing data, comprising:
a multiplicity of processors,
an object oriented pattern recognition algorithms module for pattern recognition, comprising:
a multiplicity of data files,
a decision tree system including
a parallel object oriented module operatively connected to said processors and connected to said data files to read said data and partition said data files among said multiplicity of processors, said data containing data items with features,
a parallel object oriented module operatively connected to said processors to parallel sort said data using said multiplicity of processors, if sorting is necessary,
a parallel object oriented module operatively connected to said processors to determine the best manner to split said data into subsets according to some criterion wherein said criterion is the twoing rule,
a parallel object oriented module operatively connected to said processors to split said data, and
a data mining system, having
a storage module to store the features for each data item,
a parallel object oriented linking module for linking said decision tree system and said storage module.

3. A decision tree based data mining method for processing data utilizing a multiplicity of processors, comprising the steps of:
providing data files containing objects having relevant features,
recognizing patterns among said objects based upon said relevant features,
creating a decision tree system,
using said multiplicity of processors for reading said data from said data files using an object oriented module,
using said multiplicity of processors for partitioning said data files among said multiplicity of processors,
using said multiplicity of processors for parallel sorting said data using an object oriented module and said multiplicity of processors if sorting is necessary,
determining the best manner to split said data into subsets according to some criterion using an object oriented module wherein said criterion is the twoing rule, and
splitting said data using an object oriented module.

4. A decision tree based data mining method for processing data utilizing a multiplicity of processors, comprising the steps of:
using said multiplicity of processor for reading and displaying data files, said data files containing objects having at least one feature,
partitioning said data files among said multiplicity of processors,
identifying said objects in said data files,
extracting at least one feature for each of said objects
recognizing patterns among said objects based upon said features, and
creating a decision tree, said decision tree including
using said multiplicity of processor for reading said data,
using said multiplicity of processor for parallel sorting said data using said multiplicity of processors, if sorting is necessary,
determining the best manner to split said data into subsets according to some criterion wherein said criterion is the twoing rule, and
splitting said data.

* * * * *